Patented Dec. 13, 1949

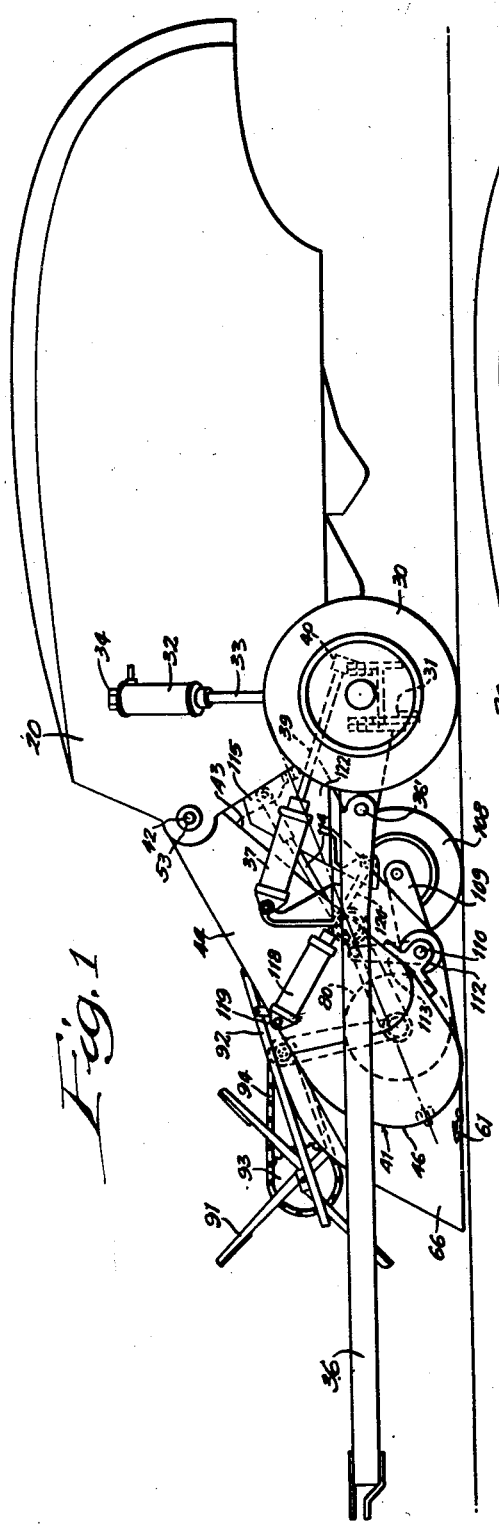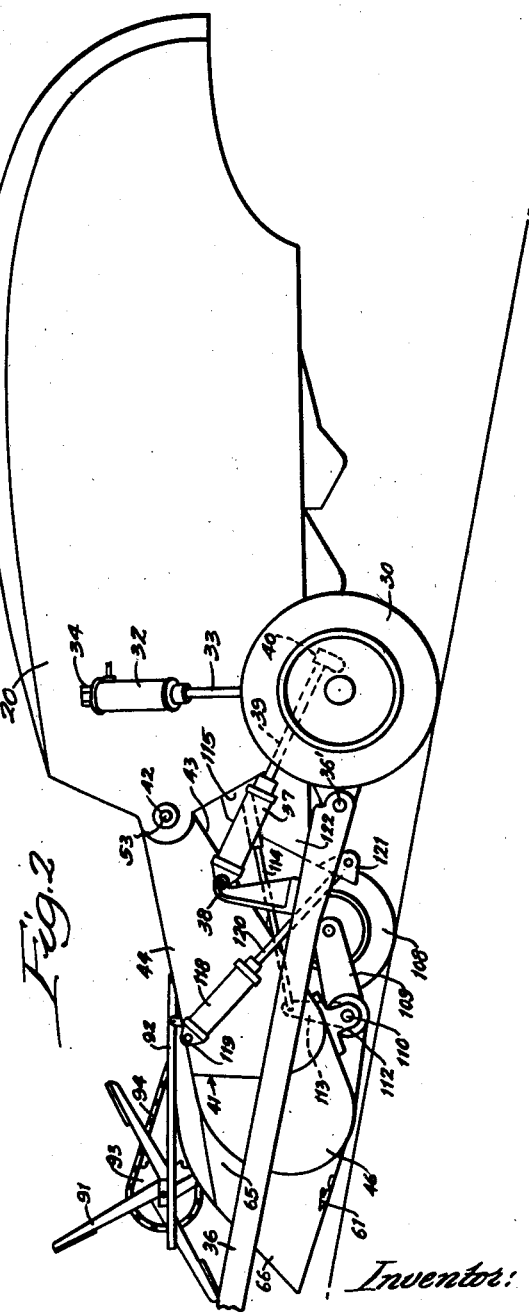

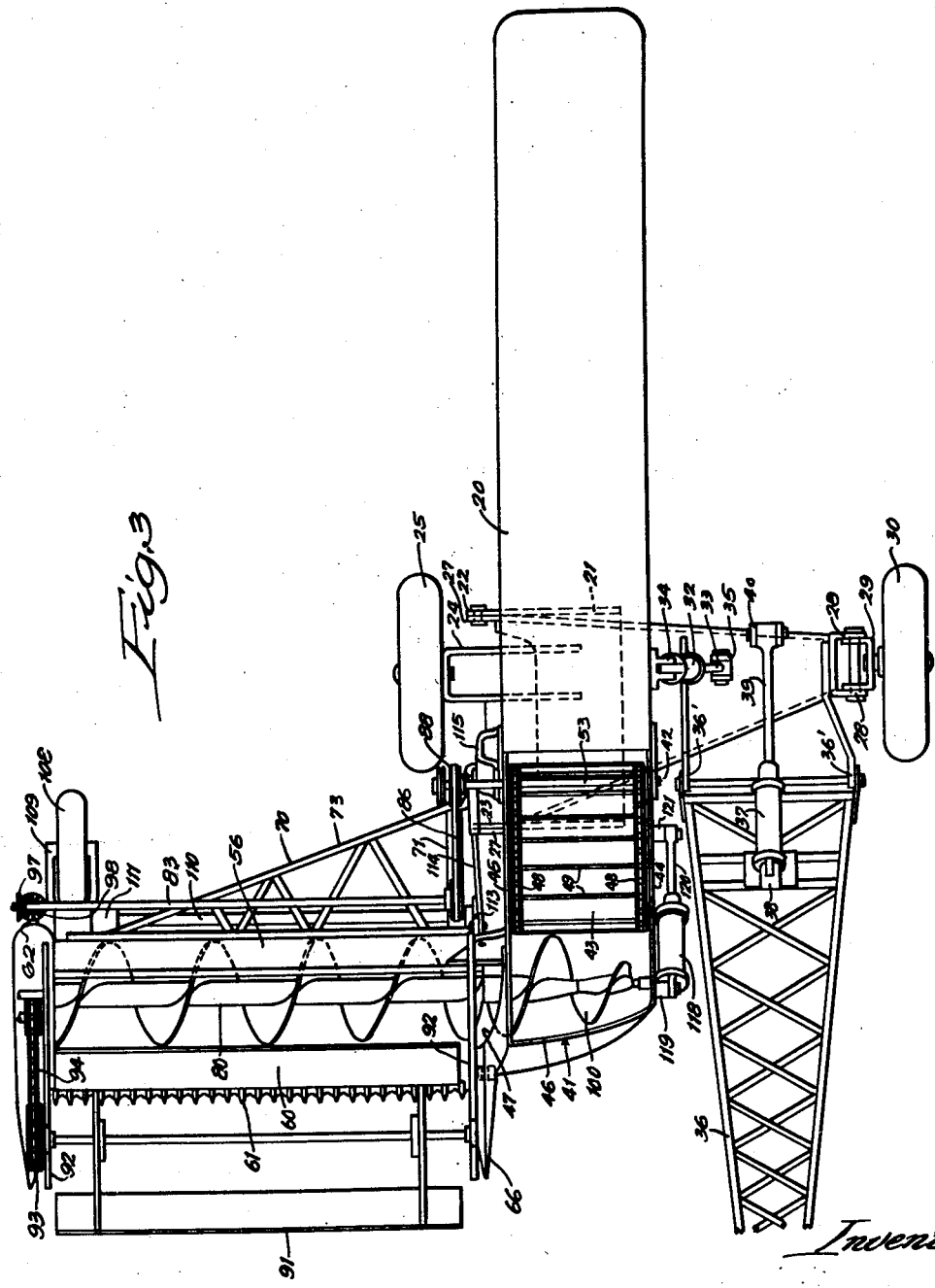

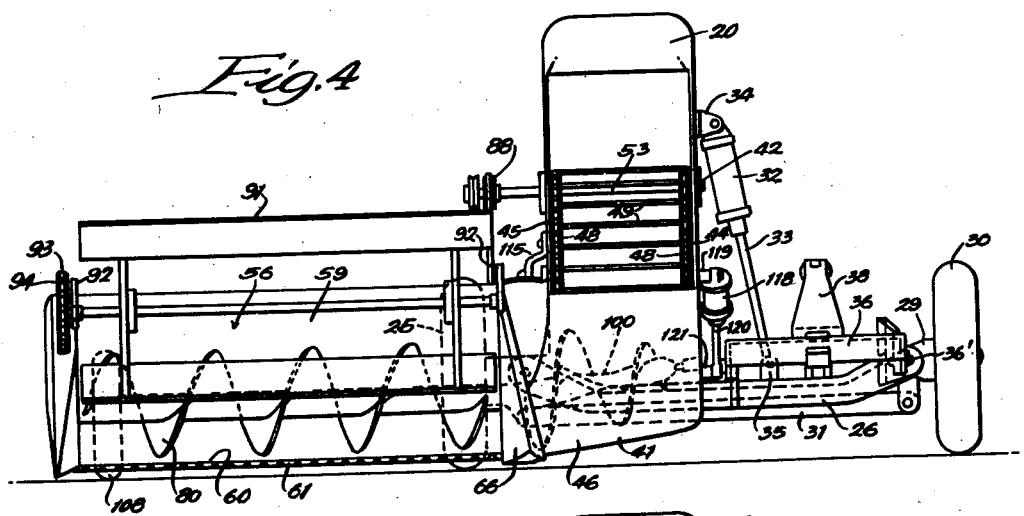
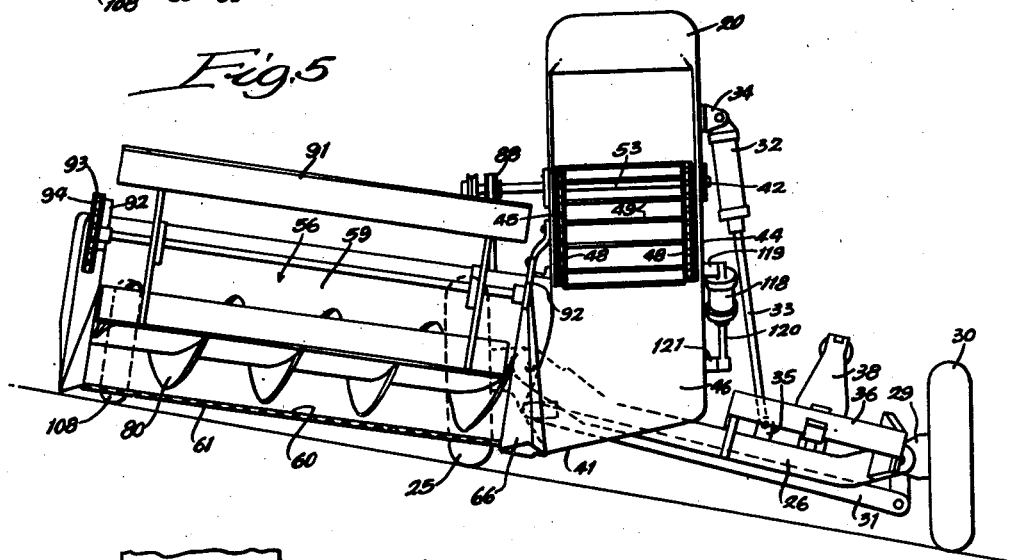
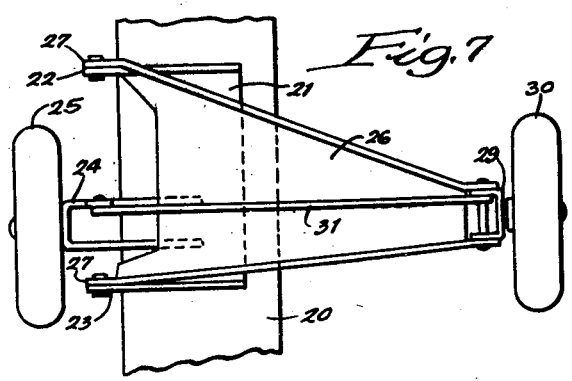
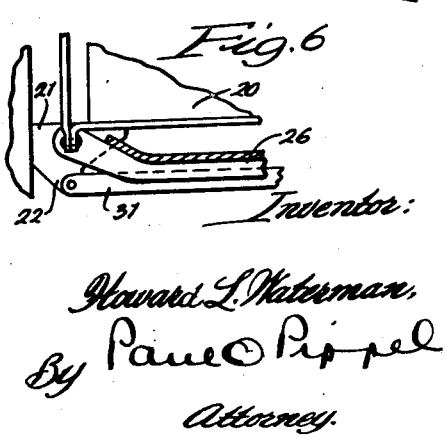

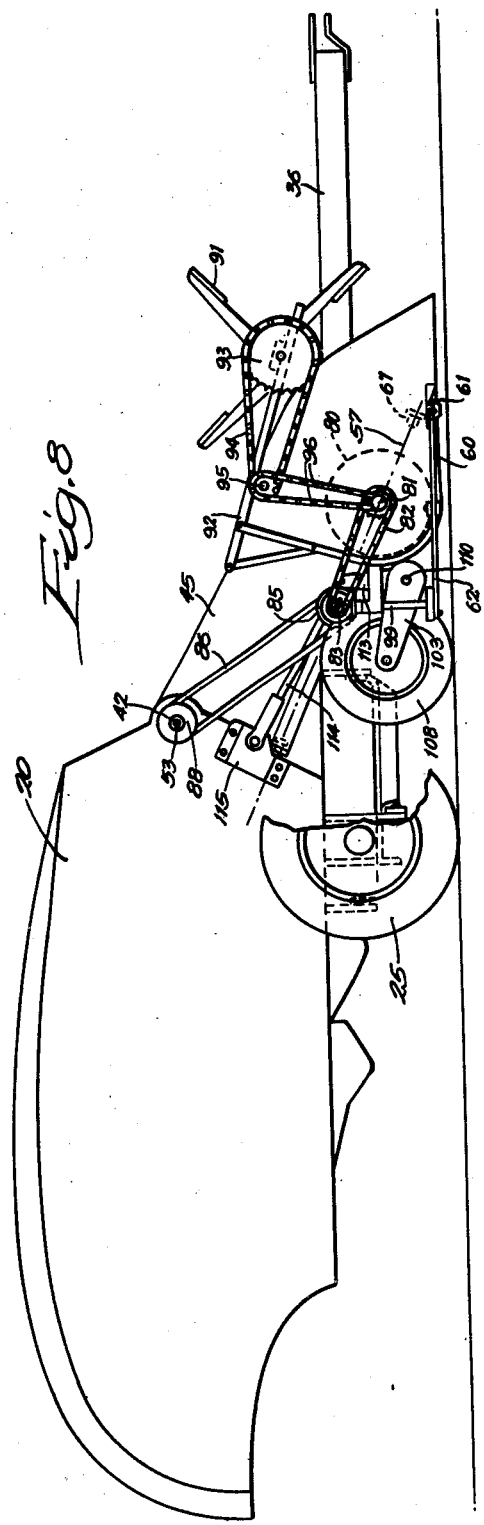

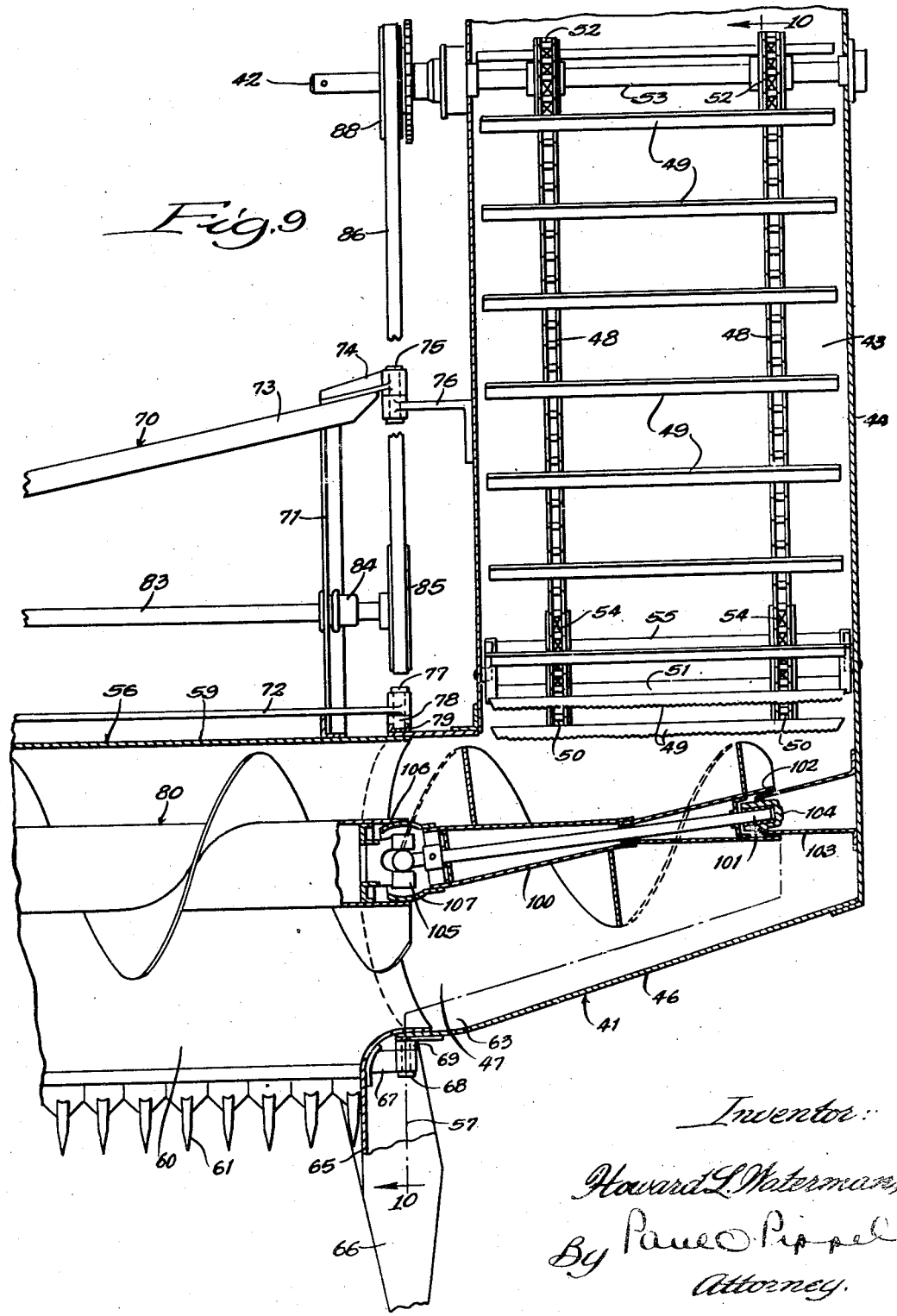

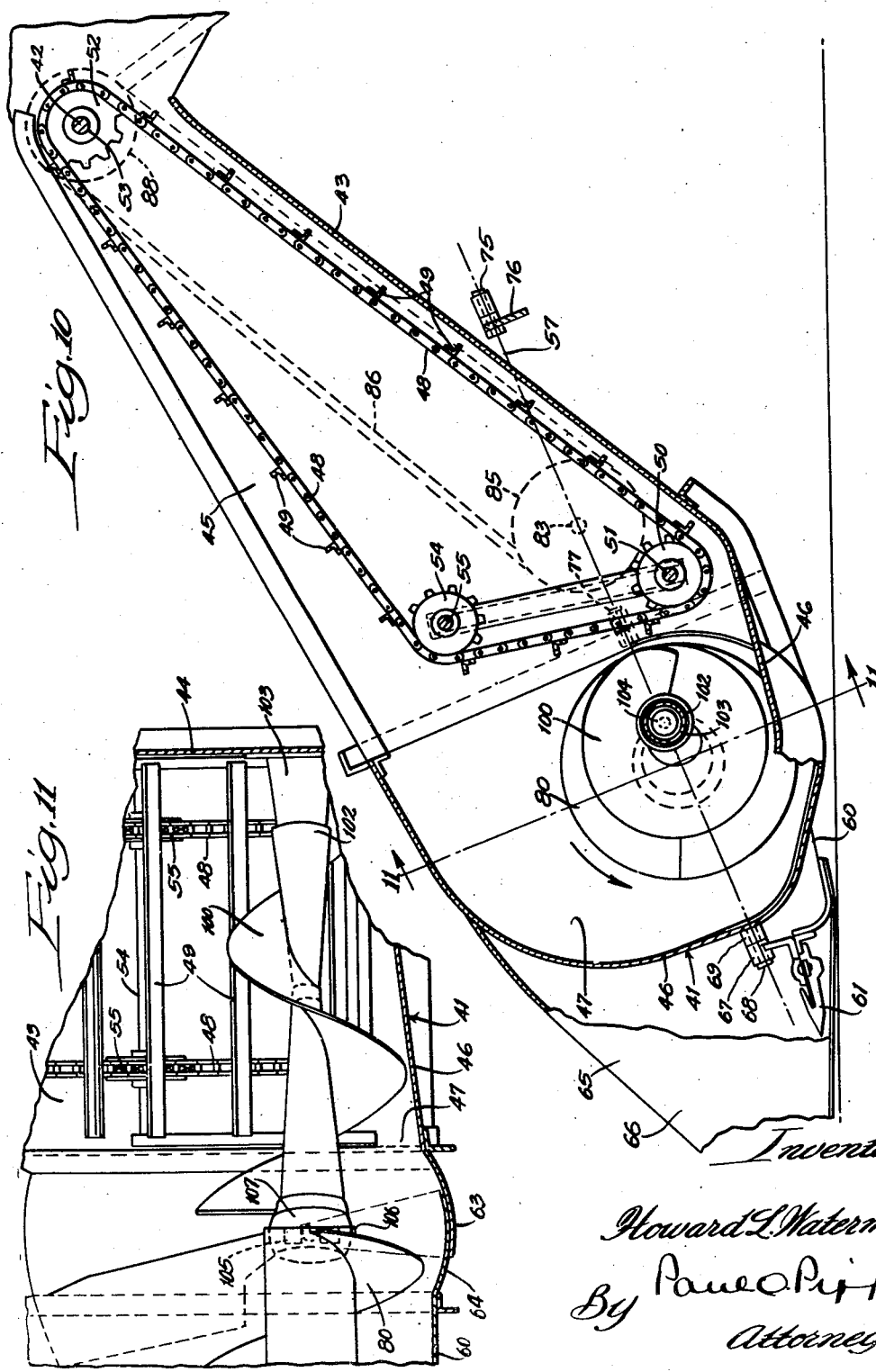

2,491,236

UNITED STATES PATENT OFFICE 2,491,236

HARVESTER THRESHER WITH PIVOTED PLATFORM AND AUGER FEED

Howard L. Waterman, Moline, Ill., assignor to International Harvester Company, a corporation of New Jersey Application December 30, 1944, Serial No. 570,546

11 Claims. (Cl. 56—20)

This invention relates to a grain harvester. More specifically, it relates to a harvester-thresher particularly adaptable for hillside operation.

In the design of traveling harvester-threshers, often designated as combines, one of the serious problems has been to maintain the thresher part in substantially horizontal position when the machine is operated on relatively steep hillsides. In order to maintain the efficiency of a grain separator of the conventional straw-walker and grain-pan type, it is necessary that the harvester-thresher be maintained in a substantially horizontal position both with respect to its longitudinal and transverse dimensions. Various types of supporting structure have been devised to accomplish generally this desired result. There are other problems in connection with the supporting of a floating platform, which must operate substantially parallel to the ground level, which are involved in side-hill operation. It is particularly in connection with the flexibility of a laterally-extending grain platform in connection with leveling means for the thresher part of a harvester thresher that the present invention is concerned.

A principal object of the present invention is to provide auger-type, grain-conveying means acting in cooperation when used with a pivoted grain platform.

Another principal object is to provide an articulated auger conveyor for delivering material over a pivoted joint between a grain platform and a feeder housing for a harvester-thresher.

The above objects and others which will be apparent from the description to follow are attained by a construction such as shown in the drawings, in which Figure 1 is a side elevation of a harvester-thresher embodying the invention;

Figure 2 is an elevation showing the harvester-thresher of Figure 1 operating on a relatively steep hillside with the thresher body in leveled position;

Figure 3 is a plan view of the harvester-thresher of Figure 1;

Figure 4 is a front view of the harvester-thresher of Figure 1 as it would appear on level ground;

Figure 5 is a similar view showing the harvester-thresher on a steep side hill with the thresher body in leveled position;

Figure 6 is a detail view showing one of the connections of the leveling linkage beneath the thresher body;

Figure 7 is a bottom view of a portion of the harvester thresher structure showing the leveling linkage in connection with the ground wheels;

Figure 8 is a side elevation view taken from the platform side of the machine;

Figure 9 is an enlarged view of a portion of the platform and the feeder housing with the feeder housing in section to show the feeding elements therein;

Figure 10 is a view taken on the line 10—10 of Figure 9;

Figure 11 is a view taken on the line 11—11 of Figure 10.

The harvester-thresher illustrated in the drawings is adapted to be pulled behind a tractor and may be operated by a tractor power take-off or by a separate engine carried on the harvester-thresher structure in the position indicated by the dot-dash lines. The harvester-thresher is of the type in which the main portion of the weight is carried on two transversely aligned ground wheels and in which means are provided for moving the wheels with the thresher body whereby the wheels remain in a vertical position and whereby the thresher remains in its normal horizontal position. A side-connected platform is pivoted to a feeder housing which is in turn pivoted to the thresher body, the other end of the platform being wheel-supported. The invention resides in the particular means for articulating the various structures, and particularly in means for maintaining the platform in any of the various adjusted positions substantially parallel to the ground. This is an important feature, as the point of connection of the platform with the feeder housing varies with every adjustment of the thresher body about either a longitudinal or a transverse axis.

The provision of a feeder housing and a platform pivotally connected thereto requires a type of feed mechanism which is flexible and which operates at an angle of the platform with respect to the feeder housing. A positive simple type of auger feed is provided by connecting the end of a normal open-end auger to an extension auger with a universal joint, the other end of the extension auger being secured to the feeder housing. This particular feed may be accomplished by other constructions in which the auxiliary auger is substantially in alignment with the main feed auger and is in effect a continuation thereof.

In the drawings, many parts of the harvester-thresher have been shown only in outline as the invention resides primarily in the geographic location of various elements and their movements and adjustments relative thereto. No internal structure has been shown in the thresher body portion of the machine as any conventional threshing mechanism may be utilized.

The thresher body 20 is generally of the self-supporting type, being formed by sheet-metal housing sections welded or otherwise rigidly secured together whereby a rigid structure is provided with comparatively little bracing from auxiliary frame members. For that reason, the thresher body will be referred to as a unit in describing the various elements which are connected thereto or mounted thereon.

As best shown in Figure 6, a bracket structure 21 extends laterally from one side of the thresher body 20, being provided with two longitudinally spaced, downwardly extending bracket portions 22 and 23, said bracket portions being best shown in Figure 7. Between said bracket portions a wheel-supporting structure 24, which may be a portion of the bracket structure 21, extends laterally outwardly beyond the bracket portions 23. A supporting wheel 25 is journaled on the supporting structure 24. Said wheel is at all times parallel to the thresher body as it is journaled upon the structure 24 which is rigid with respect to the thresher body.

A frame structure designated in its entirety by the reference character 26 has spaced connecting portions 27 which are pivotally secured on a longitudinal axis to the bracket portions 22 and 23 of the bracket structure 21. The frame structure 26 extends beneath the thresher body and laterally to the other side a substantial distance beyond the thresher body. Spaced connecting portions 28 on said frame structure are pivotally connected on a longitudinal axis to a second wheel-supporting structure 29. Said structure provides a supporting means for a second supporting wheel 30 which is transversely aligned with respect to the supporting wheel 25.

A stabilizing link in the form of a bar 31 is pivotally connected at its ends to downwardly extending portions of the wheel supporting structures 24 and 29. Said bar, in connection with the frame structure 26, forms in effect a parallel linkage which confines the outwardly spaced supporting wheel 30 for vertical movement parallel to the ground wheel 25 while permitting tilting of the thresher body 20 with respect to the ground level. To provide for such tilting movement, a hydraulic device having a cylinder 32 and an extended piston rod 33 is connected between a bracket 34 mounted on the spaced-wheel side of the thresher body 20 and a bracket 35 secured to the frame structure 26. By supplying liquid under pressure to the cylinder 32, the thresher body may be tilted with respect to the frame structure 26 whereby it may be leveled for hillside operation.

A draft frame structure 36 is pivotally connected on a transverse axis to spaced connecting portions 36' which extend forwardly from the frame structure 26. A hydraulic device is shown as providing an adjusting means for varying the angular position of the draft frame structure 36 with respect to the frame structure 26 and thereby altering the position of the thresher body 20 whereby said thresher body may be leveled to a horizontal position for various angular positions of the draft frame structure 36. It is assumed that said structure will be attached to the drawbar of a tractor which is substantially fixed with respect to its height above the ground level. The hydraulic device illustrated includes a cylinder 37 pivotally connected to a bracket 38 on the draft frame structure 36, and a piston-rod extension 39 pivotally connected to a bracket structure 40 on the frame structure 26.

A feeder housing 41 is pivotally connected on a transverse axis 42 to the front of the thresher body 20. This construction is conventional in traveling harvester-threshers to permit floating movement of the feeder housing with respect to the thresher part of the machine. Referring to Figures 9 and 10, which show the feeder housing 41 and the feeding mechanism therein: said housing includes an upwardly inclined bottom 43, spaced side walls 44 and 45, and a curved front wall structure 46. Said front wall structure is shaped to provide a large feed opening 47 for receiving material and is slanted rearwardly toward the side wall 44 to confine the material being fed and to assure its delivery into the vertical conveying means. Said vertical conveying means is in the form of what has been conventionally termed an overhead feeder. A conveyor mechanism having chains 48 and conveyor flights 49 spaced thereon operates over sprockets 50 on a transverse shaft 51, sprockets 52 on a transverse shaft 53, and sprockets 54 on a transverse shaft 55. The lower run of the conveyor operates sufficiently close to the bottom 43 and in an upward direction with respect thereto for engaging material and carrying it upwardly to be discharged at the upper end into the threshing mechanism of the thresher body 20.

A laterally extending grain platform, designated in its entirety by the reference character 56, extends laterally to the grain side of the machine from the feeder housing 41, being pivotally connected thereto on an axis indicated by the reference character 57, which is generally longitudinal of the machine, being slanted, however, upwardly to the rear. The grain platform is formed generally of sheet metal of sufficient weight to be self-supporting. Additional angle bars and other bracing means are secured to the sheet metal wherever required. Said grain platform has a back wall 59 curved forwardly at its lower portion and extending substantially horizontally in a forward direction to provide a flat grain-receiving portion 60. A conventional grain-cutting mechanism 61 is indicated as being along the forward edge of the portion 60. Said mechanism may be driven by any suitable source, a drive means 62 being indicated in Figure 8.

Adjacent the grain platform 56 and around the opening 47, the curved wall 46 of the feeder housing is provided with a generally cylindrical extension 63. Said extension, as best shown in Figure 11, is somewhat spherical at its outer end to provide for an overlapping fit of a similar extension flange 64 formed at the end of the back wall 59 and bottom portion 60 of the grain platform. This spherical fitting is provided so that a closely fitting joint may be obtained while permitting pivoting of the grain platform with respect to the feeder housing about the attaching structure, which will now be described.

At the feeder housing end of the grain platform 56, an upwardly-extending curved wall 65 provides a grain-retaining wall as well as forming a portion of the curved flange extension 64 previously mentioned. A grain divider 66 forms a continuation of the wall 65. A bracket 67 connected to the wall 65 extends laterally and is connected by a pivot pin 68 with a bracket 69 secured to the cylindrical extension 63 of the feeder housing.

At the rear of the grain platform 56 a braced supporting frame 70 extends from the outer end of the grain platform to a point adjacent the said wall 45 of the thresher body. Said frame includes a longitudinally-extending member 71, a transversely-extending bar 72 adjacent the grain platform, and a diagonally-extending bar 73. A bracket 74 secured to the bar 73 is pivoted by a pin, 75 lying on the same axis as the pin 68, to a bracket 76 secured to the wall 45 and extending laterally outwardly therefrom. The bar 72 is secured by a pin 77, also lying on the same axis as the pin 68, to a bracket 78 carried by a reinforcing channel 79 at the outer edge of the cylindrical extension 63 of the feeder housing. The three pins 68, 75, and 77 provide a pivot axis by means of which the grain platform and its associated structure are pivotally mounted on the feeder housing 41. As indicated both in Figures 8 and 10, said axis extends upwardly to the rear at a substantial angle.

An auger conveyor 80 extends the full length of the grain platform, being positioned to cooperate with the back wall 59 and the flat bottom 60 to feed grain cut by the sickle bar in an endwise direction towards the feeder housing. The auger 80 is supported entirely at its outer end by conventional means such as shown in the United States Patent No. 2,142,587. A laterally projecting drive shaft 81 for said auger is adapted to be driven by the drive chain 82 extending upwardly and rearwardly to a drive shaft 83 extending along the rear of the platform 56. Said shaft, as shown in Figure 9, is carried at the thresher side of the platform by a journal box 84 mounted on the bar 71. A pulley 85 is mounted on the end of the shaft 83, the center of said pulley lying substantially on the axis of connection of the grain platform to the feeder housing, as shown by the dotted-line position of the pulley in Figure 10 and by the full-line position of the pulley in Figure 8. A belt 86 connects the pulley 85 with a pulley 88 carried by the shaft 53. Said shaft, as previously described, also drives the feed conveyor chains 48. Said shaft also forms the pivot axis 42 by means of which the feeder housing is secured to the thresher body. Power may be delivered by any suitable means to the driving shaft 53, either from power take-off mechanism connected to the tractor or from a separate power plant mounted on the harvester thresher.

A reel assembly 91 is shown mounted in operative position above the grain platform. Said reel assembly is mounted on a supporting structure 92 extending upwardly and forwardly from the grain platform 56 at each end thereof. A drive sprocket 93 carried as a part of the reel assembly is connected by a drive chain 94 to an idler sprocket structure 95 which is in turn connected by the drive chain 96 with a sprocket on the shaft 81. By this means the reel is driven simultaneously with the auger conveyor.

Figures 3 and 8 also show additional elements of the sickle drive mechanism. A bevel gear 97 on the shaft 83 is positioned to drive a bevel gear 98 which is secured to a vertical shaft 99 at the lower end of which the sickle drive mechanism 62 is secured.

The auger 80, as previously stated, terminates adjacent the pivot axis of the grain platform 56 on the feeder housing 46. An auxiliary extension auger 100 is positioned in the housing 41 extending transversely thereof. Said auger is in effect a continuation of the auger 80 and is in substantially axial alignment therewith when the harvester-thresher is operating on level ground. One end of the auger 100, as shown in Figure 9, is provided with a shaft 101 which extends within an open-end sleeve portion 102. Said sleeve portion telescopically fits over a support 103 secured to the side wall 44 of the feeder housing extending substantially perpendicular therefrom. Said support carries a journal box 104 in which the shaft extension 101 is slidably and rotatably secured. It will be understood that the auxiliary auger 100 could be carried entirely on the wall 44 by the supporting means above described. In the embodiment illustrated, said auger is connected at what would be its free end to what would be the free end of the auger 80. Said connection is in the form of a universal joint, the center of which lies on the pivot axis of the grain platform 56 on the feeder housing 41. Said universal joint connection includes a double Y universal joint assembly 105, a projecting sleeve 106 on the auger 80, and a spherical shield 107 on the auger 100.

A grain wheel 108 is mounted on a crank axle construction 109 secured to a transversely extending shaft 110 which is rotatably mounted on the platform 56, one mounting bracket 111 being shown at the outer end of the platform in Figure 3. The other end of the shaft 110 is rotatably supported at the other end of the platform 56 by a bracket 112, as shown in Figures 1 and 2. An upwardly-extending lever 113 is secured to the end of the shaft 110, said lever terminating substantially on the pivot axis of the platform on the feeder housing. A link 114 is loosely pivoted to the upper end of the lever 113 extending upwardly substantially parallel to the pivot axis of the platform on the feeder housing. At its upper end, said link is pivotally connected to a member 115. Said member is rigidly secured to the side of the thresher body 20.

The feeder housing 41 was described as being pivotally connected to the thresher body 20 on the axis 42. To provide for pivoting adjustment of said feeder housing, a hydraulic device is shown, said device having a cylinder 118 pivotally connected to a bracket 119, as shown in Figure 3, carried by the feeder housing 41. A piston rod extension 120 of the hydraulic means is pivotally secured to a bracket 121 carried by a forwardly-extending portion 122 of the thresher body 20.

In the operation of a harvesting machine having the construction as above described in detail, the hydraulic cylinder 32 provides means for taking care of transverse inclines, as illustrated by Figures 4 and 5. The parallel linkage provided by the frame structure 26 and the bar 31 maintains the wheels in parallel vertical relation with respect to the thresher body during all positions of adjustment by tipping the thresher body about a longitudinal axis.

The hydraulic cylinder 118 provides for raising and lowering the feeder housing 41 to take care of vertical platform adjustments for cutting the grain at different heights and also to provide for inclines in a longitudinal direction as illustrated by Figures 1 and 2. The adjustment of the thresher body into a horizontal position, as illustrated by Figures 1 and 2, is taken care of by the cylinder 37. Hydraulic connections and valves have not been indicated for the lifting and adjusting cylinders as any conventional control system may be utilized for supplying liquid under pressure to the said cylinders.

As the feeder housing 41 is lifted and lowered, it is also necessary to simultaneously adjust the outer end support for the platform. By means of the shaft 110, the crank axle 109, the lever 113, and the link 114, the outer end of the platform is raised and lowered substantially the same amount as the inner end whereby said platform remains substantially parallel to the ground. As shown in an extreme position on a steep slope in Figure 5, the cutter bar is slightly angled with respect to the ground but in all intermediate positions the cutter bar is practically parallel to the ground.

The feed cutter 80 transfers a crop endwise of the platform to the opening 47 at the lateral side of the feeder housing. The auxiliary auger 100 then engages the material and feeds it inwardly into the housing and into contact with the flights 49 of the feed conveyor. The shape of the end wall 46 of the housing provides a passage of decreasing cross section whereby the material is compressed into engagement with the feed conveyor. It will be noted, also, that the outside dimension of the auxiliary auger 100 decreases to correspond to the shape of the feed housing. The universal joint connection between the augers 80 and 100, by being constructed with its center line on the pivot axis of the platform on the feeder housing, provides driving means for the auxiliary auger without introducing any strains on the supporting means for either of the augers. By this construction a substantially continuous conveyor is provided while permitting flexibility of the platform with respect to the feeder housing.

It is to be understood that applicant has shown and described only a preferred embodiment of his improved harvester-thresher with leveling adjustments, a floating grain platform, and improved feeding means therefor, and that he claims as his invention all modifications falling within the scope of the appended claims.

What is claimed is:

1. In a harvester, a crop-receiving platform pivoted on a generally longitudinal axis, grain-transferring means including an auger supported entirely from the outer end of the platform, an extension auger pivoted to said auger on a universal joint connection lying adjacent the pivot avis, and means on the harvester for supporting the end of said extension auger.

2. In a harvester, a crop-receiving platform pivoted on a generally longitudinal axis inclined upwardly to the rear, grain-transferring means including an auger supported entirely from the outer end of the platform, an extension auger pivoted to said auger on a universal joint connection lying adjacent the pivot axis, and means on the harvester for supporting the end of said extension auger.

3. In a harvester having a wheel-supported frame structure, a crop-receiving platform pivoted at one of its ends on said structure, a supporting wheel at the other end of said platform, grain-transferring means including an auger supported entirely from said other end of the platform, an extension auger pivoted to said auger by a universal joint connection lying adjacent the pivot axis, and means on the harvester frame structure for supporting the end of said extension auger.

4. In a harvester having a wheel-supported frame structure, a crop-receiving platform pivoted at one of its ends on said structure on a generally longitudinally extending axis, a supporting wheel at the outer end of said platform, grain-transferring means including an auger supported entirely from said other end of the platform, an extension auger pivoted to said auger by a universal joint connection lying adjacent the pivot axis, and means on the harvester frame structure for supporting the end of said extension auger.

5. In a harvester having a feeder housing and a grain platform pivoted to said housing at one end and supported on a wheel at its other end, grain-transferring means including an auger supported entirely at the free end of the platform, said auger terminating adjacent the pivot axis of the platform, an auxiliary auger pivoted at one end to the free end of said auger on a universal joint connection, said connection being adjacent the pivot axis of the platform, said auxiliary auger extending into the feeder housing means, and means on the conveyor housing for rotatably supporting the other end of said auxiliary auger.

6. In a harvester having a feeder housing including upwardly and rearwardly delivering conveying means and in combination therewith, a laterally extending platform pivotally connected to said housing on a longitudinally extending axis and supported on a wheel at its outer end, grain-transferring means including an auger supported entirely at the outer end of the platform, means for driving said auger, said auger terminating adjacent the pivot axis of the platform, an auxiliary auger drivingly connected at one end to said auger on a universal joint connection, said connection being adjacent the pivot axis of the platform, said auxiliary auger extending across the feeder housing substantially in axial alignment with the first named auger, and bearing means on the conveyor housing for rotatably supporting the other end of said auxiliary auger.

7. In a harvester having a feeder housing including upwardly and rearwardly delivering conveying means and in combination therewith, a laterally extending grain platform pivotally connected to said housing on a longitudinally extending axis and supported on a wheel at its outer end, grain-transferring means including an auger supported entirely at the outer end of the platform, means for driving said auger, said auger terminating adjacent the pivot axis of the platform, an auxiliary auger drivingly connected at one end to said auger on a universal joint connection, said connection being adjacent the pivot axis of the platform, said auxiliary auger extending across the feeder housing substantially in axial alignment with the first named auger and lying adjacent the conveying means, and bearing means on the conveyor housing for rotatably and slidably supporting the other end of said auxiliary auger.

8. In a harvester thresher having a longitudinally positioned thresher body and a feeder housing pivotally secured to the thresher body on a transverse axis, an upwardly delivering conveying means on said housing, a grain platform pivoted to said housing on a generally longitudinally upwardly inclined axis and extending laterally therefrom, a wheel support for the other end of said platform, grain-transferring means including an auger supported entirely at the outer end of the platform and extending thereacross to a point adjacent the pivot axis of the platform, means for driving said auger, an auxiliary auger pivoted to the free end of said auger on a universal joint connection, said connection being on the platform pivot axis, said auxiliary auger extending across the feeder housing adjacent the conveying means, and means on the conveyor housing for rotatably and slidably supporting the end of said auxiliary auger.

9. In a harvester thresher having a longitudinally positioned thresher body, and a wheeled supporting structure for said body, means to tilt the body about transverse and longitudinal axes with respect to said supporting structure, a feeder housing pivotally secured to the thresher body on a transverse axis, an upwardly delivering conveying means on said housing, a grain platform pivoted to said housing on a generally longitudinal axis and extending laterally therefrom, a wheel support for the other end of said platform, grain transferring means including an auger supported entirely at the outer end of the platform and extending thereacross to a point adjacent the pivot axis of the platform, means for driving said auger, an auxiliary auger pivoted to the free end of said auger on a universal joint connection, said connection being adjacent the platform pivot axis, said auxiliary auger extending across the feeder housing adjacent the conveying means, and means on the conveyor housing for rotatably and slidably supporting the end of said auxiliary auger.

10. In a harvester thresher having a longitudinally positioned thresher body and a wheeled supporting structure for said body, means to tilt the body about a transverse axis with respect to said supporting structure, a feeder housing pivotally secured to the thresher body on a transverse axis, an upwardly delivering conveying means on said housing, a grain platform pivoted to said housing on a generally longitudinal axis and extending laterally therefrom, a wheeled support for the other end of said platform, grain transferring means including an auger supported entirely at the outer end of the platform and extending thereacross to a point adjacent the pivot axis of the platform, means for driving said auger, an auxiliary auger pivoted to the free end of said auger on a universal joint connection, said connection being on the platform pivot axis, said auxiliary auger extending across the feeder housing adjacent the conveying means, and means on the conveyor housing for rotatably and slidably supporting the end of said auxiliary auger.

11. In a harvester thresher having a longitudinally positioned thresher body, and a wheeled supporting structure for said body, means to tilt the body about transverse and longitudinal axes with respect to said supporting structure, a feeder housing pivotally secured to the thresher body on a transverse axis, an upwardly delivering conveying means on said housing, a grain platform pivoted to said housing on a generally longitudinal axis and extending laterally therefrom, a wheel supported at the other end of said platform for relative vertical movement with respect thereto, adjusting linkage connecting said wheel and the thresher body operative to maintain the platform substantially parallel to the ground during relative tilting of the thresher body, grain transferring means including an auger supported entirely at the outer end of the platform and extending thereacross to a point adjacent the pivot axis of the platform, means for driving said auger, an auxiliary auger pivoted to the free end of said auger on a universal joint connection, said connection being on the platform pivot axis, said auxiliary auger extending across the feeder housing adjacent the conveying means, and means on the conveyor housing for rotatably and slidably supporting the end of said auxiliary auger.

HOWARD L. WATERMAN.

REFERENCES CITED

The following references are of record in the file of this patent:

UNITED STATES PATENTS

| Number | Name | Date |
| --- | --- | --- |
| Re. 21,161 | Korsmo | July 25, 1939 |
| 1,877,520 | MacGregor | Sept. 13, 1932 |
| 1,913,034 | Lindgren et al. | June 6, 1933 |
| 2,040,699 | Lindgren | May 12, 1936 |
| 2,057,403 | Vali et al. | Oct. 13, 1936 |
| 2,155,422 | Korsmo | Apr. 25, 1939 |
| 2,161,634 | Pierson | June 6, 1939 |
| 2,224,970 | Lindgren et al. | Dec. 17, 1940 |
| 2,262,906 | Raney et al. | Nov. 18, 1941 |
| 2,269,977 | Johnson | Jan. 13, 1942 |
| 2,368,219 | Heath | Jan. 30, 1945 |